| United States Patent Office | 3,520,890
Patented July 21, 1970 |
|---|---|

3,520,890
DIBENZOCYCLOHEPTATRIENYLPIPERAZINES
Jean Clement Louis Fouche, Bourg-la-Reine, France, assignor to Rhone-Poulenc S.A., Paris, France, a French body corporate
No Drawing. Filed Mar. 29, 1967, Ser. No. 626,698
Claims priority, application France, Mar. 29, 1966, 55,495, Patent 1,516,742
The portion of the term of the patent subsequent to June 13, 1984, has been disclaimed
Int. Cl. C07d 51/66
U.S. Cl. 260—268                           4 Claims

ABSTRACT OF THE DISCLOSURE

The invention provides new substituted 10- or 11-piperazin-1-yl-dibenzo[a,d]cycloheptatrienes. These compounds have useful pharmacodynamic activity on the central nervous system, e.g. as neuroleptics.

---

This invention relates to dibenzo[a,d]cycloheptatriene derivatives and their preparation.

The invention provides the dibenzo[a,d]cycloheptatriene derivatives of the formula:

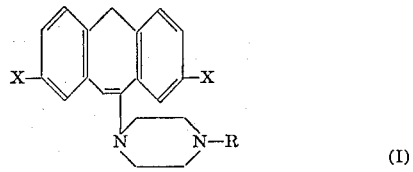

and their acid addition salts and quaternary ammonium derivatives, in which one of the symbols X is hydrogen, and the other is halogen, especially chlorine or bromine, alkyl of 1 to 5 carbon atoms, alkoxy of 1 to 5 carbon atoms, or alkylthio of 1 to 5 carbon atoms, R is alkyl of 1 to 5 carbon atoms, and the carbon atoms of the piperazine nucleus are optionally substituted by one or more methyl groups.

The compounds of Formula I, and certain of the intermediates mentioned below, are disubstituted in either the 2,11-position or in the 2,10-position, in accordance with the two following systems of numbering:

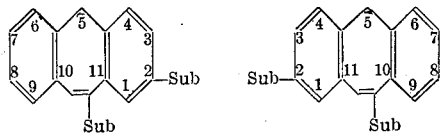

Sub representing a substituent.

According to a feature of the invention, the dibenzo[a,d]cycloheptatrienes of Formula I are prepared by reacting an organometallic compound of the formula:

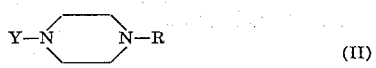

in which Y is Hal-Mg- (where Hal is halogen) or Li-, R is as hereinbefore defined and the carbon atoms of the piperazine nucleus are optionally substituted by one or more methyl groups, with a mixture of 10- and 11-halogeno-dibenzo[a,d]cycloheptatrienes of the formula:

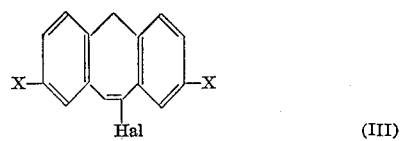

where Hal and X are as hereinbefore defined, the reaction being effected in the presence of hexamethylphosphotriamide when Y is Hal-Mg-, separating the mixture of piperazinyl-dibenzo[a,d]cycloheptatrienes produced, and optionally converting a dibenzo[a,d]cycloheptatriene base obtained into an acid addition salt or quaternary ammonium derivative thereof. When Y is a lithium atom, the reaction may be effected in an inert organic solvent such as an ether, especially diethyl ether, preferably at the boiling point.

In this reaction a mixture of 10- and 11-piperazinyl-dibenzo[a,d]cycloheptatrienes which are substituted in the 2-position is obtained. The components of these mixtures may be separated by means of the usual methods, such as for example fractional crystallisation, using their acid addition salts if desired or required.

The halogenomagnesium derivatives of Formula II may be prepared by reacting methylmagnesium iodide in hexamethylphosphotriamide with a piperazine compound of general formula:

wherein R is as hereinbefore defined, and the carbon atoms of the piperazine nucleus may be substituted by one or more methyl radicals.

The mixture of 10- and 11-halogeno-dibenzo[a,d]cycloheptatrienes of Formula III may be obtained by dehydrohalogenation of a 10,11-dihalogeno-dibenzo[a,d]cycloheptadiene of the formula:

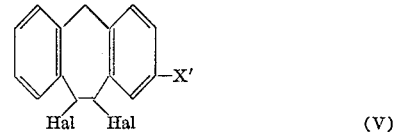

wherein Hal is as hereinbefore defined and X′ represents a halogen atom or an alkyl, alkoxy or alkylthio radical as aforesaid. The usual dehydrohalogenation conditions can be used, particularly reaction with alcoholic potassium hydroxide.

The 10,11-dihalogeno-dibenzo[a,d]cycloheptadienes of Formula V may be obtained by halogenation of the dibenzo[a,d]cycloheptatrienes of the formula:

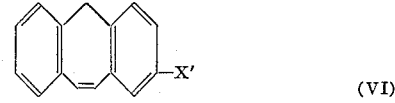

in which X′ is as hereinbefore defined, by the usual methods for adding halogens to a double bond.

The dibenzo[a,d]cycloheptatrienes of Formula VI may be obtained by dehydrohalogenation of the dibenzo[a,d]cycloheptadienes of the formula:

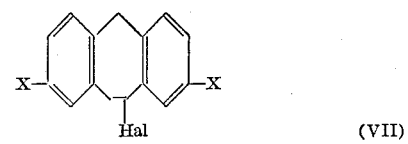

wherein Hal and the symbols X are as hereinbefore defined. This reaction may be carried out by reaction with a secondary or tertiary organic base.

The dibenzo[a,d]cycloheptadienes of Formula VII may be prepared from the corresponding alcohols of the formula:

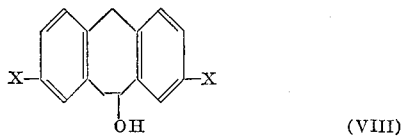
(VIII)

wherein the symbols X are as hereinbefore defined, by the usual methods of preparation of halogenated derivatives of alcohols.

The alcohols of Formula VIII may be prepared by reducing the corresponding ketones of the formula:

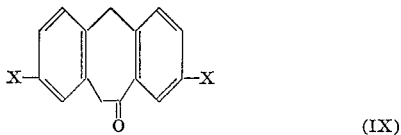
(IX)

wherein the symbols X are as hereinbefore defined. This reduction may be carried out by the standard methods of reduction of ketones to alcohols, particularly by catalytic hydrogenation in the presence of Adams platinum or of Raney nickel or by reaction with an alkali metal borohydride.

The ketones of Formula IX may be prepared by cyclising compounds of the formula:

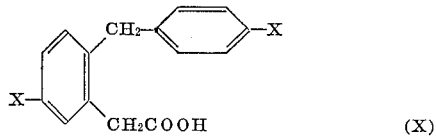
(X)

wherein the symbols X are as hereinbefore defined. This cyclisation is advantageously carried out by heating the compounds of Formula X in the presence of polyphosphoric acid or of its esters, preferably to a temperature of between 60° and 180° C. The compounds of Formula X may also be converted into the corresponding acid chlorides by standard methods, and the latter may then be cyclised by a Friedel-Crafts reaction, for example with aluminium chloride in a solvent such as carbon disulphide.

The acids of Formula X may themselves be prepared by esterifying an acid of the formula:

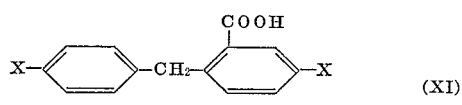
(XI)

wherein the symbols X are as hereinbefore defined, with methanol, followed by reducing the resulting ester to an alcohol of the formula:

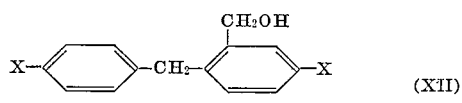
(XII)

wherein the symbols X are as hereinbefore defined. This alcohol is treated with a halogenating agent, preferably a chlorinating agent, to yield a compound of the formula:

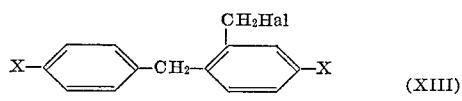
(XIII)

wherein Hal and the symbols X are as hereinbefore defined. Finally the compound of Formula XIII is reacted with an alkali metal cyanide, and the resulting nitrile of formula:

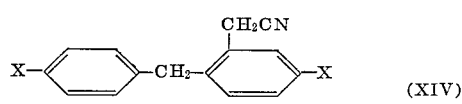
(XIV)

is hydrolysed to give the acid of Formula X.

The benzoic acids of Formula XI may be prepared by reducing the phthalides of the formula:

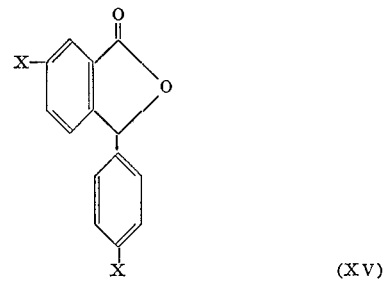
(XV)

wherein the symbols X are as hereinbefore defined. This reaction may be carried out by processes known per se, for example by the action of a reducing agent such as zinc in an ammoniacal medium.

The phthalides of general Formula XV may be prepared by reacting a phenylmagnesium halide of formula:

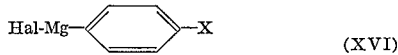
(XVI)

with a benzoic acid of the formula:

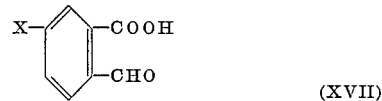
(XVII)

where the two symbols X in Formulae XVI and XVII and Hal are as hereinbefore defined.

The acids of Formula XVII may be prepared by the method described by Vaughan et al., J. Amer. Chem. Soc., 68, 1314 (1946) for the preparation of 2-formyl-5-chlorobenzoic acid, that is to say by hydrolysis of phthalides of the formula:

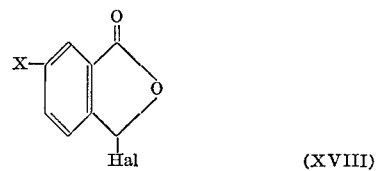
(XVIII)

wherein X and Hal are as hereinbefore defined.

The benzoic acids of Formula XI may also be prepared by condensing, by the Friedel-Crafts method, a compound of the formula:

(XIX)

with a compound of formula:

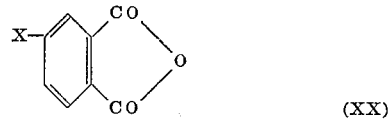
(XX)

where the two symbols X in Formulae XIX and XX are as hereinbefore defined. This condensation yields a compound of the formula:

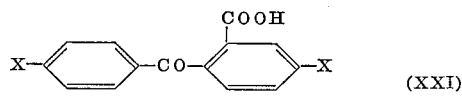
(XXI)

the CO group of which is then reduced to a $CH_2$ group in manner known per se.

The compounds of Formula I may optionally be purified by physical methods (such as distillation, crystallisation or chromatography) or by chemical methods (such as the formation of salts, and the crystallisation of these, followed by decomposition in an alkaline medium. In these operations the nature of the anion of the salt is unimportant, the only condition being that the salt be well defined and easily crystallisable).

The compounds of Formula I and their acid addition salts and quaternary ammonium derivatives, have interesting pharmacodynamic properties. They are active on the central nervous system, especially as neuroleptics and tranquillisers. They also have a good antihistaminic, antiserotoninic, antiemetic and analgesic effect. They have given good results in physiological tests with animals at doses of 0.01 to 50 mg. per kilo of animal, administered orally. The compounds of formula:

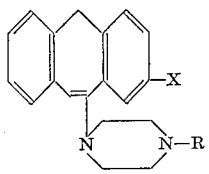

and their acid addition salts and quaternary ammonium derivatives, in which X is halogen, alkyl of 1 to 5 carbon atoms, alkoxy of 1 to 5 carbon atoms, or alkylthio of 1 to 5 carbon atoms, and R is alkyl of 1 to 5 carbon atoms, have particularly interesting physiological properties, especially the compounds in which X is chlorine or methyl and R is methyl.

For medicinal use, the new compounds may be employed either as bases or as pharmaceutically acceptable acid addition salts or quaternary ammonium derivatives, that is to say salts which are non-toxic in the doses used.

As examples of pharmaceutically acceptable acid addition salts, there may be mentioned the salts of mineral acids (such as the hydrochlorides, sulphates, nitrates or phosphates) and of organic acids (such as the acetates, propionates, succinates, benzoates, oxalates, fumarates, maleates, theophylline - acetates, salicylates, phenolphthalinates and methylene-bis-β-hydroxynaphthoates) or of the substitution derivates of these acids.

As examples of pharmaceutically acceptable quaternary ammonium salts, there may be mentioned derivatives of mineral or organic esters such as the methochlorides, methobromides, methiodides, ethochlorides, ethobromides, ethoiodides, allylchlorides, allylbromides, allyliodides, benzylchlorides, benzylbromides, benzyliodides, the methyl- and ethyl-sulphates, the benzenesulphonates or the substitution derivatives of these compounds.

The acid addition salts may be obtained by the action of the bases of Formula I on acids in appropriate solvents. Suitable organic solvents include, for example, alcohols, ethers, ketones or chlorinated solvents. The salt formed precipitates, after optional concentration of its solution, and is separated off by filtration or decantation.

The quaternary ammonium derivatives may be obtained by the action of the bases of Formula I on suitable reactive esters, optionally in an organic solvent, at ordinary temperaure, otr more rapidly, with gentle heating.

The following examples illustrate the invention.

EXAMPLE 1

Hexamethylphosphotriamide (260 cc.) is added to a solution of methylmagnesium iodide prepared from magnesium turnings (31.6 g.), methyl iodide (189 g.) and anhydrous diethyl ether (520 cc.). While cooling in a water bath to maintain the internal temperature at about 30° C., a solution of 1-methylpiperazine (263 g.) in hexamethylphosphotriamide (260 cc.) is poured in. A solution of a mixture of 2-chloro-10-bromodibenzo[a,d] cycloheptatriene and 2-chloro-11-bromo - dibenzo[a,d]- cycloheptatriene (80.5 g.) in hexamethylphosphotriamide (390 cc.) is then added. The reaction mixture is heated for two hours under reflux (internal temperature 50° C.). After cooling, the reaction mixture is treated with a solution of ammonium chloride (1000 g.) in distilled water (3000 cc.). Diethyl ether (500 cc.) is added. The aqueous solution is decanted and washed three times with diethyl ether (a total of 1500 c.). The combined ethereal solutions are washed ten times, until neutral, with distilled water (a total of 2000 cc.), and then dried over anhydrous sodium sulphate. After evaporating the diethyl ether, the residue (70 g.) is dissolved in ethyl acetate (100 cc.) and then treated with a boiling solution of fumaric acid (25.2 g.) in ethyl acetate (250 c.). After two hours cooling to 3° C., the crystals which have appeared are suction-filtered, washed with ethyl acetate (25 cc.), and dried under reduced pressure (20 mm. Hg). A mixture (43.8 g.) of 2-chloro-10-(4-methyl-1-piperazinyl) dibenzo[a,d]cycloheptatriene fumarate and 2-chloro-11- (4-methyl - 1 - piperazinyl)dibenzo[a,d]cycloheptatriene fumarate, melting about 255° C., is obtained.

This mixture of fumarates is treated with N sodium hydroxide (1500 cc.) and diethyl ether (2000 c.). The decanted aqueous solution is washed with diethyl ether (750 cc.). The combined ethereal solutions are washed six times with distilled water (a total of 900 cc.), dried over anhydrous potassium carbonate, and evaporated. A crude mixture (30.1 g.) of 2-chloro - 10 - (4-methyl-1- piperazinyl)dibenzo[a,d]cycloheptatriene and 2-chloro- 11-(4-methyl-1-piperazinyl)dibenzo[a,d]cycloheptatriene containing, according to infra-red spectrography, approximately 50% of each of the two products is obtained. These 30.1 g. of crude base are dissolved in boiling diisopropyl ether (120 cc.). After 4 hours cooling to 3° C., the crystals which have appeared are suction-filtered, washed with ice-cold diisopropyl ether (15 cc.) and dried under reduced pressure (20 mm. Hg). Crude 2-chloro-10- (4-methyl - 1 - piperazinyl)dibenzo[a,d]cycloheptatriene (14.4 g.), melting at 146° C., is obtained. This product is purified by recrystallisation from acetonitrile (120 cc.) and then from ethanol (75 cc.). Finally, 2-chloro-10-(4- methyl-1-piperazinyl)dibenzo[a,d]cycloheptatriene (11.2 g.), M.P. 152° C., is obtained.

The filtrate from the preceding treatment is evaporated. The residue (16 g.) is crystallised from diisopropyl ether (50 cc.). A product (8.6 g.), melting about 120° C., is obtained. After recrystallisation from acetonitrile (25 cc.), a product (7.5 g.), melting at 120° C., is obtained. On crystallisation from diisopropyl ether (45 cc.), a product (3.67 g.), melting at 129° C., is isolated which is finally purified by a last recrystallisation from diisopropyl ether (18 cc.). 2-chloro-11-(4-methyl-1-piperazinyl)dibenzo[a,d]cycloheptatriene (2.77 g.), M.P. 133° C., is obtained.

The structure of the products is established by acid hydrolysis. 2 - chloro-10-(4-methyl-1-piperazinyl)dibenzo [a,d]cycloheptatriene (M.P.=152° C.) yields 2-chloro- 10-oxo-dibenzo[a,d]cycloheptadiene, M.P. 146–147° C. 2 - chloro-11-(4-methyl-1-piperazinyl)dibenzo[a,d]cycloheptatriene (M.P.=133° C.) yields 2-chloro-11-oxo-dibenzo[a,d]cycloheptadiene, M.P. 104° C.

These hydrolysis products are identical to those obtained by synthesis as described below for the preparation of the 2-chloro-10-bromo (and 11-bromo) dibenzo[a,d] cycloheptatrienes used as starting materials.

The 2 - chloro-10-bromo-dibenzo[a,d]cycloheptatriene and 2 - chloro-11-bromo - dibenzo[a,d]cycloheptatriene starting materials may be prepared in the following manner. 2-(4-chlorobenzyl)benzoic acid (M.P.=130° C.) is prepared by the method of Bradley, J. Chem. Soc., p. 323 (1956), followed by esterification of this acid with methanol. Reduction of this ester with lithium aluminium hydride produces 2-(4-chlorobenzyl)benzyl alcohol which is then reacted with 48% strength hydrobromic acid to produce 2-(4-chlorobenzyl)benzyl bromide (M.P.=58° C.). The latter with potassium cyanide yields 2-(4-chlorobenzyl)phenylacetonitrile, a brown oil distilling at 168– 170° C. under reduced pressure (0.3 mm. Hg). Hydrolysis of this nitrile with KOH in aqueous ethanol gives (after acidification) 2-(4-chlorobenzyl)phenylacetic acid (M.P.=140°C.), which is then heated in polyphosphoric acid to produce 2-chloro-11-oxo-dibenzo[a,d]cycloheptadiene (M.P.=104° C.). Reduction of the latter with potassium borohydride in aqueous methanol yields 2-chloro- 11 - hydroxy - dibenzo[a,d]cycloheptadiene (M.P.=80–

84° C.) which, by reaction with thionyl chloride in chloroform, yields 2,11-dichloro-dibenzo[a,d]cycloheptadiene. Dehydrohalogenation of this dichloro derivative by reaction with 1-methylpiperazine, followed by elimination of basic products by washing with acid, yields a neutral phase consisting of 2-chloro-dibenzo[a,d]cycloheptatriene (M.P.=98 to 104° C. depending on the allotropic form), 2-chloro-10,11-dibromo-dibenzo [a,d]cycloheptadiene (67.5 g., M.P.=131–135° C.) is prepared by reaction of bromine (33.6 g.) with 2-chloro-dibenzo[a,d]-cycloheptatriene (45.3 g.) in methylene chloride. A mixture (82.5 g.) of 2-chloro-10-bromo-dibenzo[a,d]cycloheptatriene and 2-chloro-11-bromo-dibenzo[a,d]cycloheptatriene (as a crude oil) is prepared by reaction of a solution of ethanolic potassium hydroxide (75 cc. of a 3.5 N solution) with a solution of 2-chloro-10,11-dibromo-dibenzo[a,d]-cycloheptadiene (101.8 g.) in dioxane (390 cc.) at 40° C. for 20 hours.

The 2-chloro-10-bromo- and 2-chloro-11-bromo-dibenzo[a,d]cycloheptatrienes used as starting material may also be prepared from 2,10-dichloro-dibenzo[a,d]cycloheptadiene, itself obtained in the following manner. 2-formyl - 5 - chlorobenzoic acid (M.P.=140° C.) is prepared by the method of Vaughan et al., J. Amer. Chem. Soc., 68, 1314 (1946). It is then converted into 3-phenyl-6-chloro-phthalide (M.P.=93.5–94.5° C.) by reaction with phenylmagnesium bromide. Reduction of the phthalide with zinc powder in an ammoniacal medium produces 2 - benzyl-5-chlorobenzoic acid (M.P.=128–129° C.), which is then esterified with methanol. Reduction of this ester by lithium aluminium hydride yields 2-benzyl-5-chlorobenzyl alcohol which, on treatment with hydrobromic acid, is converted into 2-benzyl-5-chlorobenzyl bromide (M.P.=52° C.). The latter is reacted with potassium cyanide to yield (2-benzyl-5-chlorophenyl)acetonitrile (M.P.=35° C.). Hydrolysis of this nitrile with KCH in aqueous ethanol produces (2-benzyl-5-chlorophenyl)acetic acid (M.P.=114.5–116° C.), which is cyclised by heating in polyphosphoric acid to yield 2-chloro-10-oxo-dibenzo[a,d]cycloheptadiene (M.P.=146–147° C. Reduction of the latter with potassium borohydride in aqueous methanol yields 2-chloro - 10 - hydroxy-dibenzo[a,d]cycloheptadiene (M.P.=122–123° C.) which is converted into 2 - 10 - dichloro-dibenzo[a,d]cycloheptadiene by reaction with thionyl chloride.

EXAMPLE 2

A solution of 1-methylpiperazine (58.0 g.) in diethyl ether (150 cc.) is added over the course of 30 minutes, at 20° C., to a solution of butyl lithium prepared from butyl bromide (79.5 g.) and lithium (10.3 g.) in anhydrous diethyl ether (650 cc.). After 30 minutes stirring, a mixture (41.9 g.) of 2-methyl-10-bromo-dibenzo[a,d]cycloheptatriene and 2-methyl-11-bromo-dibenzo[a,d]cycloheptatriene dissolved in anhydrous diethyl ether (150 cc.) is added over the course of 15 minutes. The reaction mixture is then heated at the reflux temperature of the diethyl ether for 4 hours. After cooling, the reaction products are hydrolysed with distilled water (1500 cc.) whilst the temperature is kept below 10° C. The decanted aqueous solution is washed three times with diethyl ether (a total of 1500 cc.). The combined diethyl ether phases are washed ten times, until neutral, with distilled water (a total of 2500 cc.), dried over anhydrous potassium carbonate and evaporated. The residue obtained (42.4 g.) is dissolved in anhydrous ethanol (120 cc.) and then treated with a boiling solution of fumeric acid (24.4 g.) in anhydrous ethanol (150 cc.). After one hour's cooling at 5° C., the crystals which have appeared are suction-filtered, washed three times with ethanol (a total of 150 cc.), and dried under reduced pressure (20 mm. Hg). A mixture (34.9 g.) of 2-methyl-10-(4-methyl-1-piperazinyl)dibenzo[a,d]cycloheptatriene and 2 - methyl-11-(4-methyl - 1-piperazinyl)dibenzo[a,d]cycloheptatriene fumarates, melting at 206–209° C., is obtained.

This mixture of fumarates, when treated with excess sodium hydroxide in the presence of diethyl ether yields, after the usual treatment (e.g. as described in Example 1), an oily mixture (22.6 g.) of two bases which are dissolved in boiling diisopropyl ether (90 cc.). After cooling to 5° C. for 3 hours, the crystals which have appeared are suction-filtered, washed and dried. 2-methyl-10-(4-methyl-1 - piperazinyl)dibenzo[a,d]cycloheptatriene (3.8 g.), melting at 120° C., is obtained. This product is purified by recrystallisation from diisopropyl ether. It then melts at 128° C. The filtrate from the preceding treatment is evaporated. The residue is dissolved in anhydrous ethanol (110 cc.) and then treated with a slight excess of gaseous anhydrous hydrogen chloride. In this way a mixture (10.6 g.) of crystalline hydrochlorides, melting about 220° C., is recovered. The filtrate from the mixture of hydrochlorides is evaporated and treated with sodium hydroxide. After purification by conversion into the fumarates in ethanol and reconversion into the base, the resulting residue is crystallised from petroleum ether. 2-methyl - 11-(4 - methyl-1-piperazinyl)dibenzo[a,d]cycloheptatriene (0.7 g.), melting at 110° C. is obtained.

Starting with the various mother liquors and the crystalline mixture of the preceding hydrochlorides, it is possible to recover other fractions of the two products by various treatments such as conversion to the hydrochlorides and fumarates and crystallisation of the bases. Overall, 2 - methyl-10-(4-methyl-1-piperazinyl)dibenzo-[a,d]cycloheptatriene (52.2 g.), M.P. 128° C., and 2-methyl-11-(4-methyl - 1 - piperazinyl)dibenzo[a,d]cycloheptatriene (1.45 g.), M.P. 110° C., are obtained.

The structure of these products is established by acid hydrolysis. The 2-methyl-10-(4-methyl - 1 - piperazinyl) dibenzo[a,d]cycloheptatriene (M.P.=128° C.) yields 2-methyl-10-oxo-dibenzo[a,d]cycloheptadiene, M.P. 88–90° C. The 2-methyl-11-(4-methyl-1-piperazinyl)dibenzo [a,d]cycloheptatriene (M.P.=110° C.) yields 2-methyl-11-oxo-dibenzo[a,d]cycloheptadiene, M.P. 64° C.

The 2-methyl-10-bromo- and 2-methyl-11-bromo-dibenzo[a,d]cycloheptatrienes may be prepared in the following manner. 2-methyl-11-oxo-dibenzo[a,d]cycloheptadiene (207 g., M.P.=65° C.) is prepared by heating a mixture of polyphosphoric acid with 2-(4-methylbenzyl)-phenylacetic acid (303 g., M.P.=124° C.) at 100° C. for 3 hours. 2-methyl-11-hydroxy-dibenzo[a,d]cycloheptadiene (55.3 g., M.P.=85° C.) is prepared by reaction of potassium borohydride (27 g.) with 2-methyl-11-oxo-dibenzo[a,d]cycloheptadiene (55.5 g.). 2-methyl-dibenzo [a,d]cycloheptatriene (45.6 g.) is prepared by reaction of anhydrous hydrogen chloride with 2-methyl-11-hydroxy-dibenzo[a,d]cycloheptadiene (53.1 g.) in refluxing ethanol. 2-methyl-10,11-dibromo-dibenzo[a,d]cycloheptadiene (55.9 g., M.P.=144–145° C.) is prepared by reaction of bromine (37.2 g.) with 2-methyl-dibenzo[a,d]cycloheptatriene (45.5 g.) in methylene chloride. An oily mixture (42.1 g.) of 2-methyl-10-bromo- and 2-methyl-11-bromo-dibenzo[a,d]cycloheptatrienes is prepared by reaction of potassium hydroxide with 2-methyl-10,11-dibromo-dibenzo[a,d]cycloheptadiene (55.6 g.) in a mixture of ethanol and dioxane at 25° C.

The invention includes within its scope pharmaceutical compositions comprising, in association with a pharmaceutically acceptable carrier or coating, at least one dibenzo[a,d]cycloheptatriene derivative of Formula I or non-toxic acid addition salt or quaternary ammonium derivative thereof. These compositions may be in a form suitable for oral, rectal or parenteral administration.

Solid compositions for oral administration include tablets, pills, powders and granules. In such solid compositions, the active compound is mixed with one or more inert diluents such as sucrose, lactose or starch. These compositions may also comprise, as is normal practice, substances other than diluents, e.g. lubricants, such as magnesium stearate.

Liquid compositions for oral administration include pharmaceutically acceptable emulsions, solutions, suspensions, syrups and elixirs containing inert diluents, such as water or paraffin oil. These compositions may also comprise substances other than diluents, for example wetting agents, sweeteners, perfumes and preservatives.

Compositions according to the invention for parenteral administration may be aqueous or non-aqueous sterile solutions, suspensions or emulsions. As solvent or vehicle, propylene glycol, polyethylene glycol, vegetable oils, especially olive oil, and injectable organic esters, for example ethyl oleate, may be used. These compositions may also contain adjuvants, more particularly wetting, emulsifying and dispersing agents. Sterilisation may be carried out in various ways, for example by means of a bacteriological filter, by incorporating sterilising agents into the composition, by irradiation or by heating. The compositions may also be prepared in the form of sterile solid compositions which may be dissolved at the time of use in sterile water or any other sterile injectable medium.

Compositions for rectal administration are suppositories which, in addition to the active substance, contain excipients such as cocoa butter or a suppository wax.

The dose to be used depends on the desired therapeutic effect, the route of administration and the duration of the treatment. When administered orally, generally between 0.1 and 500 mg. of active compound per day for an adult is administered.

EXAMPLE 3

Tablets having the following composition are prepared by the usual method.

|  | Mg. |
|---|---|
| 2-chloro-11-(4-methyl-1-piperazinyl)dibenzo[a,d]cycloheptatriene | 2.8 |
| Starch | 110 |
| Colloidal silica | 35 |
| Magnesium stearate | 2.2 |

I claim:
1. A dibenzo[a,d]cycloheptatriene of the formula:

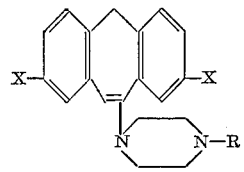

and its non-toxic acid addition salts, in which one of the symbols X is hydrogen and the other is halogen, straight chain alkyl of 1 to 5 carbon atoms, or straight chain alkoxy of 1 to 5 carbon atoms, and R is alkyl of 1 to 5 carbon atoms.

2. A dibenzo[a,d]cycloheptatriene as claimed in claim 1 of the formula:

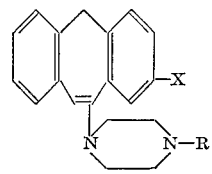

and its non-toxic addition salts, in which X is halogen, straight chain alkyl of 1 to 5 carbon atoms, or straight chain alkoxy of 1 to 5 carbon atoms, and R is as defined in claim 1.

3. The dibenzo[a,d]cycloheptatriene claimed in claim 2 in which X is chlorine and R is methyl, and its non-toxic acid addition salts.

4. The dibenzo[a,d]cycloheptatriene claimed in claim 2 in which X is methyl and R is methyl, and its non-toxic acid addition salts.

References Cited

UNITED STATES PATENTS

| 3,167,541 | 1/1965 | Van der Stelt | 260—268 |
| 3,257,404 | 6/1966 | Fouche | 260—268 |
| 3,320,259 | 5/1967 | Cuscic | 260—268 |
| 3,325,497 | 6/1967 | Fouche | 260—268 |
| 3,357,982 | 12/1967 | Van der Stelt | 260—268 |

DONALD G. DAUS, Primary Examiner

U.S. Cl. X.R.

260—343.3, 346.3, 465, 469, 470, 515, 521, 544, 590, 609, 611, 649, 694; 424—250